United States Patent
Komamaki (10) Patent No.: US 6,930,894 B2
(45) Date of Patent: Aug. 16, 2005

(54) SWITCHING POWER SUPPLY AND DISTRIBUTED PARAMETER STRUCTURE

(75) Inventor: Moritoshi Komamaki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 130 days.

(21) Appl. No.: 10/463,415

(22) Filed: Jun. 18, 2003

(65) Prior Publication Data

US 2004/0062060 A1 Apr. 1, 2004

(30) Foreign Application Priority Data

Sep. 27, 2002 (JP) .................................. 2002-282806

(51) Int. Cl.$^7$ ............................................. H02M 3/335
(52) U.S. Cl. ...................................... 363/20; 363/21.12
(58) Field of Search ............................. 363/15, 16, 20, 363/21.01, 21.02, 21.03, 21.12, 12.17, 21.18, 55, 56.01, 56.12, 95, 97, 131

(56) References Cited

U.S. PATENT DOCUMENTS

| | | | | |
|---|---|---|---|---|
| 5,140,511 A | * | 8/1992 | Lee et al. ................ | 363/21.07 |
| 5,771,159 A | * | 6/1998 | Sako et al. ................ | 363/17 |
| 5,798,913 A | * | 8/1998 | Tiesinga et al. .......... | 363/21.13 |
| 6,563,720 B2 | * | 5/2003 | Kitano ..................... | 363/21.15 |
| 6,683,798 B2 | * | 1/2004 | Matsuura et al. ......... | 363/17 |

FOREIGN PATENT DOCUMENTS

JP          63-30230          8/1988

* cited by examiner

Primary Examiner—Matthew V. Nguyen
(74) Attorney, Agent, or Firm—Westerman, Hattori, Daniels & Adrian, LLP

(57) ABSTRACT

A switching power supply causes fewer losses, being capable of suppressing surges generated at a switching element, and providing improved conduction noise characteristics. The present invention is a switching power supply, wherein voltages and currents are varied by turning said switching element on and off to convert input voltages into output voltages, comprising a distributed parameter line with a line length of about

$$\frac{n}{4}$$

(n is an integer of one or more) of a wavelength peculiar to a potential point at said fluctuating potential point in said switching power supply.

7 Claims, 11 Drawing Sheets

SWITCHING POWER SUPPLY AND DISTRIBUTED PARAMETER STRUCTURE

BACKGROUND OF THE INVENTION

1. Field of the Invention

The present invention relates to a switching power supply, wherein electric power is controlled by turning a switching element on and off, and to a distributed parameter structure for use in said switching power supply.

2. Description of the Prior Art

Figure 1:
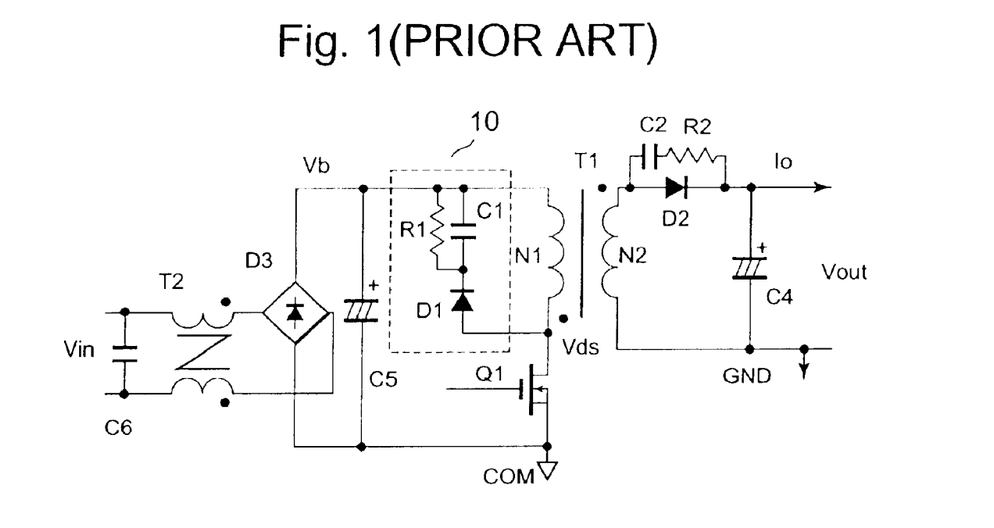
FIG. 1 is a schematic block diagram of a prior art switching power supply.

FIG. 1 shows a schematic block diagram of a fly-back converter, which is an example of prior art switching power supplies.

In FIG. 1, an input power supply Vin is connected to an X capacitor C6, to a line filter T2 which is a filter inductor, to a diode bridge D3, and to a bulk capacitor C5.

A voltage Vb of the bulk capacitor C5 is connected to one end of a primary winding N1 of a transformer T1, the other end of the primary winding N1 of the transformer T1 being connected to a voltage Vds of the drain of a switching element Q1, and the source of the switching element Q1 is connected to a stable potential COM.

A capacitor C1, a resistance R1, and a diode D1 configure a CRD snubber circuit 10 which is a primary snubber circuit. The anode of the diode D1 is connected to the drain Vds of the switching element Q1, one end of the resistance R1 and one end of the capacitor C1 being connected to the cathode of the capacitor D1, while the other end of the resistance R1 and the other end of the capacitor C1 being connected to the voltage Vb.

The CRD snubber circuit 10 branches off at the voltage Vds in the main line, which is a route from the primary winding N1 of the transformer T1 to the drain of the switching element Q1.

A secondary winding N2 of the transformer T1 is connected to an output Vout via a rectifier circuit of a diode D2 and a smoothing circuit of a capacitor 4.

A capacitor C2 and a resistance R2 are connected serially to configure a CR snubber circuit which is a secondary snubber circuit, and are connected in parallel to the diode D2.

Behaviors of the above-mentioned prior art embodiment in FIG. 1 will be explained hereunder. The input power supply Vin is rectified at the diode bridge D3, smoothed at the bulk capacitor C5, and becomes the voltage Vb. The switching element Q1 turns on and off the voltage Vb that is applied to the primary winding N1 of the transformer T1. A voltage induced at the secondary winding N2 of the transformer T1 is rectified at the diode D2, smoothed at the capacitor C4, and becomes the output voltage Vout.

The voltage Vds changes in square waves when the switching element Q1 is turned on and off. Also, a surge is generated when the switching element Q1 is turned on and off. The surge is influenced by the parasitic inductance and parasitic capacity of the transformer T1 and by the output capacity and switching characteristics of the switching element Q1. The CRD snubber circuit 10 suppresses a voltage surge, which is generated when the switching element Q1 is turned off.

More specifically, when the switching element Q1 is turned on, the voltage Vds is low and the diode D1 is turned off. Then, when the switching element Q1 is turned off, the voltage Vds increases while a voltage surge is generated. When the voltage Vds increases, the diode D1 is turned on while the capacitor C1 provides an electric charge. Increase of the voltage Vds is suppressed when the capacitor C1 provides an electric charge. Electric charges of the capacitor C1 are discharged at the resistance R1.

A part of the noise that is generated when the switching element Q1 is turned on or off is passed on to the input power supply Vin via the diode bridge D3, the line filter T2, and the X capacitor C6. The main inductance of the line filter T2 attenuates common mode elements of noise. The leaked inductance of the line filter T2 and the X capacitor C6 attenuate normal mode elements of noise.

Figure 2:
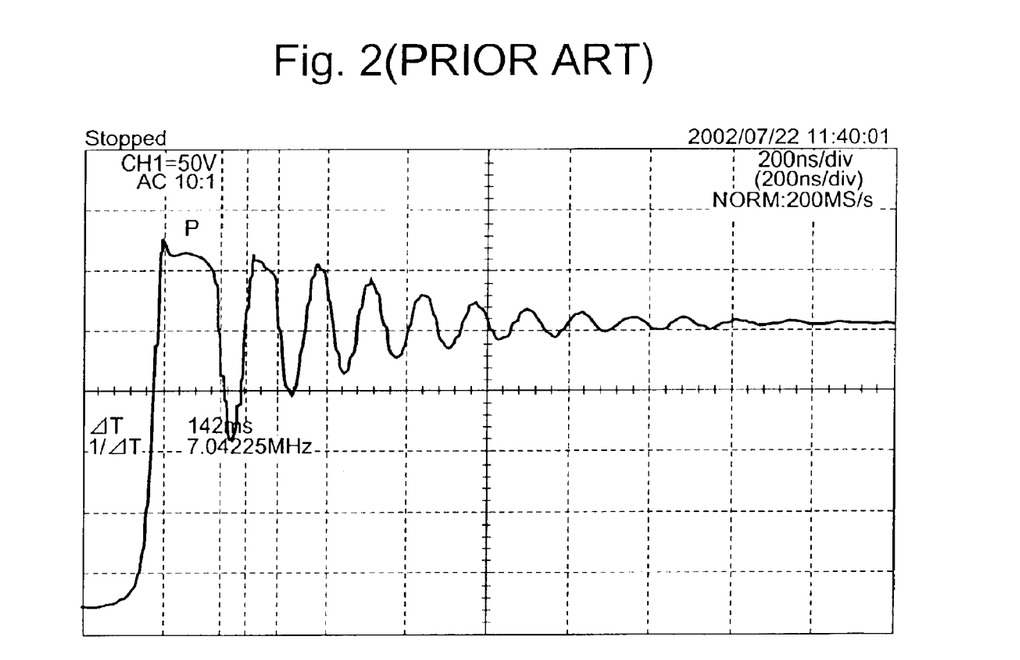
FIG. 2 illustrates waveforms of the voltage Vds of the prior art embodiment in FIG. 1.

FIG. 2 illustrates the waveforms of the voltage Vds that was generated when the switching element Q1 was turned off in the prior art embodiment of FIG. 1. A voltage surge was generated when the frequency was approximately 7 MHz. When the diode D1 was turned on at the high voltage point P, the capacitor C1 clamped the oscillations of the voltage surge of the voltage Vds. The amplitude of the voltage surge of the voltage Vds was attenuated gradually as the energy became heat, noise, and others.

Figure 3:
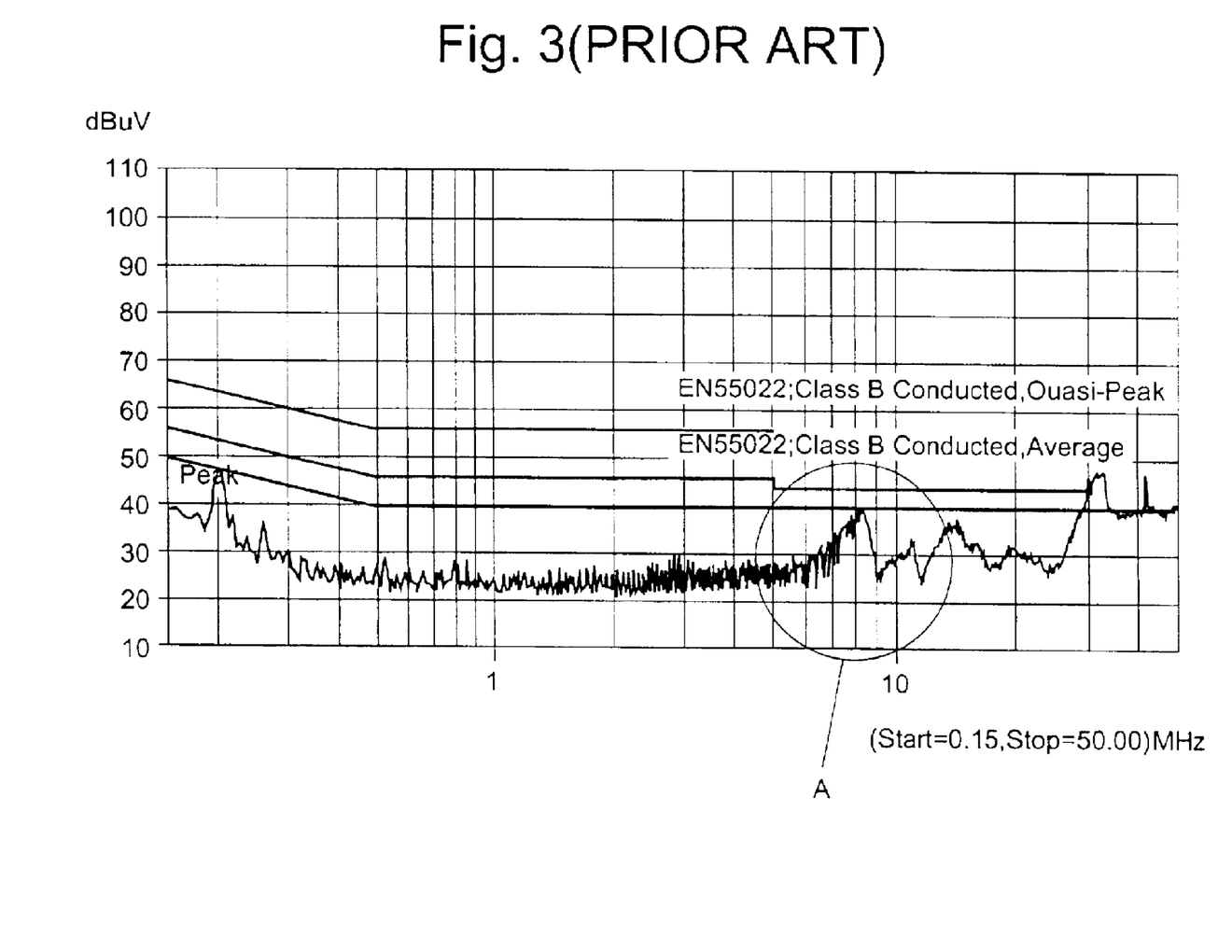
FIG. 3 illustrates conduction noise characteristics of the prior art embodiment in FIG. 1.

FIG. 3 illustrates conduction noise characteristics of the prior art embodiment in FIG. 1. In FIG. 3, the portion A shows the noise which peaked at the frequency of 8 MHz. The portion A was generated when a voltage surge of the voltage Vds in FIG. 2 became conduction noise. The reason why frequencies did not match in FIGS. 2 and 3 was that they were mainly influenced by parasitic capacities of probes when waveforms were measured.

Also, the CR snubber circuit comprising the capacitor C2 and the resistance R2 suppresses a voltage surge generated at the diode D2.

Moreover, some of the prior art switching power supplies have wirings equipped at their transformers in order to eliminate common mode signals (for example, see the Japanese Utility Model Gazette 1988-30230 according to the concept proposed by the present applicant).

An object of such prior art embodiments is to realize an insulated DC power supply circuit that is less influenced by common mode signals by means of windings of a transformer. The object, however, cannot be a cause or a motivation of suppression of surges generated at a switching element. Furthermore, the object does not include any intention to add windings to filter inductors.

Figure 4A:
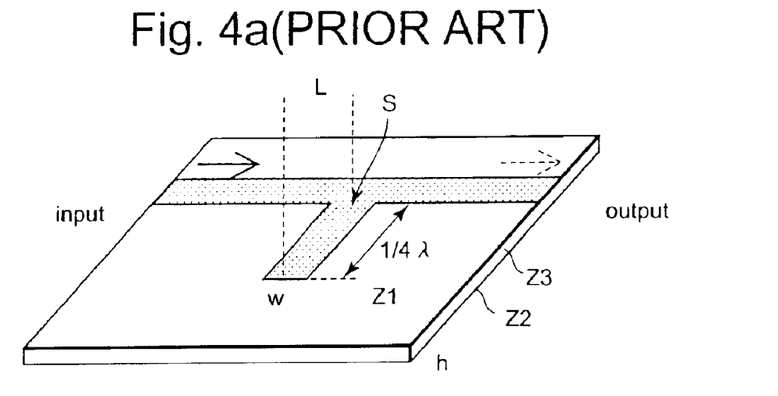
FIGS. 4(a) and 4(b) are schematic diagrams of a prior art micro strip line, with 4(a) being a perspective diagram and (b) being a cross section.
Figure 4B:
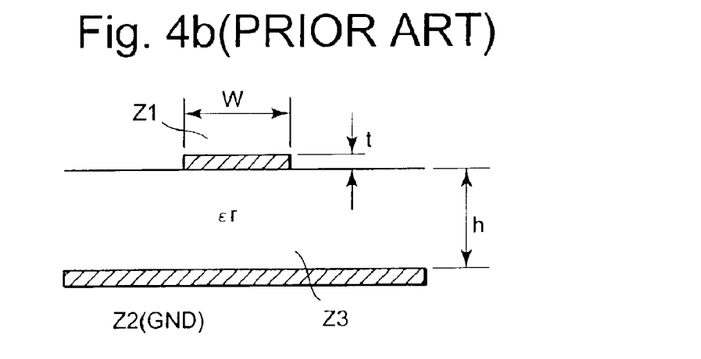

On the other hand, FIG. 4(a) and FIG. 4(b) are schematic diagrams of a prior art micro strip line and show a distributed parameter structure.

FIG. 4(a) shows a perspective diagram. A distributed parameter line Z1 branches off at the point S in the main line which runs from the input port to the output port. The distributed parameter line Z1 is open-ended and becomes an open stub.

When the line length L of the distributed parameter line Z1 is $$\frac{1}{4} \cdot \lambda$$

($\lambda$ is a wavelength), the distributed parameter line Z1 acts as a filter for the wavelength $\lambda$ and separates specific frequency elements of signals propagated in the main line.

FIG. 4(b) shows a cross section. The distributed parameter line Z1 is formed by a conductor of the width W and the thickness t on a flat plate. A stable potential surface Z2 is connected to a stable potential GND, is formed by a conductor on a flat plate which is sufficiently wider than the distributed parameter line Z1, and is arranged in parallel with the distributed parameter line Z1. A dielectric Z3 having the thickness h and the relative dielectric constant ∈r is formed so that it is placed between the distributed parameter line Z1 and the stable potential surface Z2.

Accordingly, in the prior art distributed parameter structure, the distributed parameter line Z1 is formed as a linear and flat conductor on a flat surface. The stable potential surface Z2 is formed as a flat conductor.

Next, the distributed parameter line Z1 is explained in detail. A frequency f and a wavelength λ have approximately the following relationship:

$$\lambda = C/f/Sqrt(\in r)$$

Here, C is the speed of light ($3*10^8$ m/s) and ∈r is the relative dielectric constant of the dielectric Z3 (4.21 in the case of polyurethane). A wavelength in the dielectric Z3 is proportional to the inverse number of the square root of the relative dielectric constant ∈r. That is, the wavelength is reduced to $1/Sqrt(\in r)$ in comparison with the wavelength in vacuum.

For example, when f=7 MHz and ∈r=4.21 are given, λ=20.9 m is produced and consequently $$\frac{1}{4} \cdot \lambda = 5.22 \text{ m}$$

is obtained. The characteristics of the distributed parameter line Z1 are almost determined by its line length L. Influences of its width W and thickness t, the thickness h of the dielectric Z3, and others are small.

However, these switching power supplies have problems such as increased losses due to a resistance R1 and deterioration of conduction noise characteristics.

In addition, if a prior art distributed parameter structure Z1 is applied in a wavelength corresponding to a frequency band (MHz band) that is liable to cause a problem for switching power supplies, there is another problem of larger size.

More specifically, if a distributed parameter line Z1 of 5.22 m is formed linearly, a switching power supply becomes larger in size and consequently impractical.

SUMMARY OF THE INVENTION

An object of the present invention is to solve the above-mentioned problems by providing a switching power supply, which causes fewer losses, is capable of suppressing surges generated at a switching element, and provides improved conduction noise characteristics.

Another object of the present invention is to provide a distributed parameter structure, whereby the size of the switching power supply can be reduced for wavelengths corresponding to bands of low frequencies.

DETAILED DESCRIPTION OF THE PREFERRED EMBODIMENTS

Figure 5:
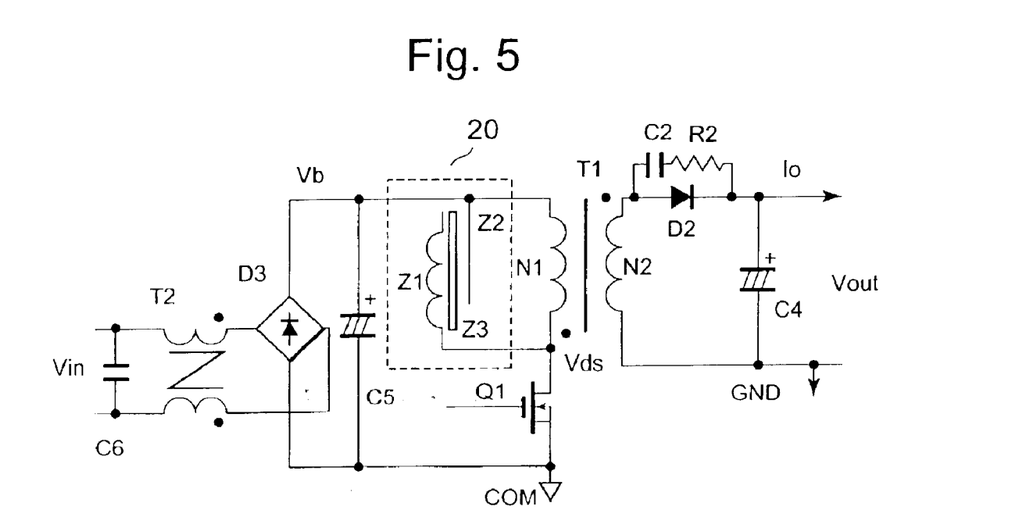
FIG. 5 is a schematic block diagram showing an embodiment of the present invention.

Preferred embodiments of the present invention will be described in detail with reference to FIG. 5. FIG. 5 is a schematic block diagram showing an embodiment of a switching power supply according to the present invention. The same elements of said embodiment as those of a prior art embodiment in FIG. 1 will be given the same symbols and their explanations will be omitted.

The embodiment in FIG. 5 is characterized in that a distributed parameter snubber circuit 20 is provided as a primary snubber circuit, comprising a distributed parameter line Z1, a stable potential surface Z2, and a dielectric Z3.

In the distributed parameter snubber circuit 20, the distributed parameter line Z1, the stable potential surface Z2, and the dielectric Z3 configure a distributed parameter filtering circuit.

In the main line which is a route from a primary winding N1 of a transformer T1 to the drain of a switching element Q1, the distributed parameter snubber circuit 20 configures a filter on the distributed parameter line Z1 branching off at the voltage Vds, and is formed in an open stub.

One end of the distributed parameter line Z1 is connected to the voltage Vds which is a fluctuating potential point in a switching power supply, and the other end of the distributed parameter line Z1 is open. The distributed parameter line Z1 has a line length which is one fourth of a wavelength corresponding to the 7 MHz frequency of a voltage surge peculiar to the voltage Vds.

The stable potential surface Z2 is arranged adjacent to the distributed parameter line Z1 and is connected to a voltage Vb which is a stable potential. The dielectric Z3 is provided between the distributed parameter line Z1 and the stable potential surface Z2.

Figure 6:
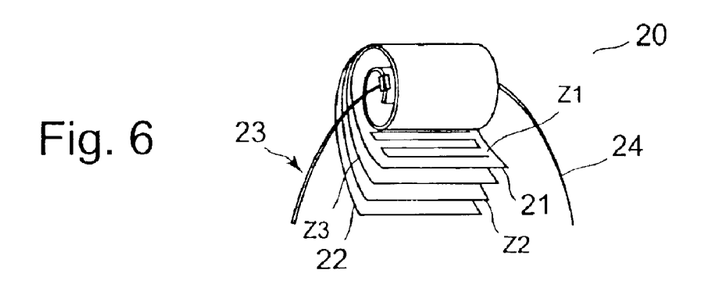
FIG. 6 is a schematic diagram showing an embodiment of a distributed parameter snubber circuit 20.

FIG. 6 is a schematic diagram showing an embodiment of the distributed parameter snubber circuit 20 and shows a distributed parameter structure. The distributed parameter line Z1 is formed windingly in a folded structure on a film 21, is arranged adjacent to a dielectric Z3 which is formed in foils, is further arranged adjacent to a stable potential surface Z2 with equal potential surfaces which is formed in foils, is still further arranged adjacent to an insulating film 22, and at the same time forms all of the foregoing in a winding and folded manner like a film capacitor.

One end of the distributed parameter line Z1 is connected to a drawing line 23 and the drawing line 23 is connected to the voltage Vds, which is a fluctuating potential point in the switching power supply. The other end of the distributed parameter line Z1 is open.

The drawing line 23 is a part of the distributed parameter line Z1 and the line length of the drawing line 23 becomes a part of the line length of the distributed parameter line Z1.

Similarly, the stable potential surface Z2 is connected to a drawing line 24 and the drawing line 24 is connected to the voltage Vb, which is a stable potential in the switching power supply.

Figure 7:
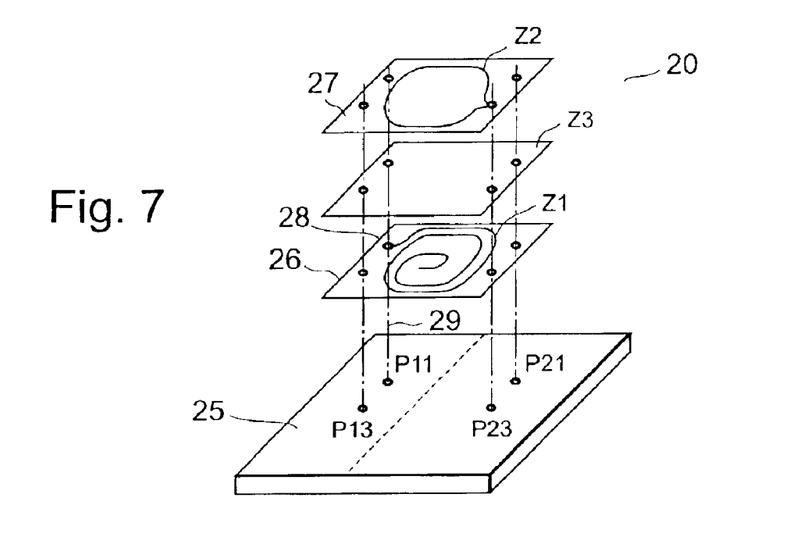
FIG. 7 is a schematic diagram showing another embodiment of the distributed parameter snubber circuit 20.

FIG. 7 is a schematic diagram showing another embodiment of the distributed parameter snubber circuit 20 and shows a distributed parameter structure. The schematic diagram of FIG. 7 is characterized in that the distributed parameter snubber circuit 20 comprises multilayer print coils.

The distributed parameter line Z1 is formed in a whirling manner of a winding structure on a wiring layer 26, is arranged adjacent to a dielectric Z3, is further arranged adjacent to a wiring layer 27 on which a stable potential surface Z2 is arranged, and forms a structure in which all of the foregoing are stacked like multilayer print coils.

One end of the distributed parameter line Z1 is connected to a connection hole 28, the connection hole 28 is connected to a means 29 for linking connection holes, and the means 29 for linking connection holes is connected to a connection hole P11 of a printed circuit board 25 of the switching power supply and is connected to the voltage Vds which is a fluctuating potential point in the switching power supply. The other end of the distributed parameter line Z1 is open.

The connection hole 28, the means 29 for linking connection holes, and the connection hole P11 constitute a part of the distributed parameter line Z1, and their line lengths constitute a part of the line length of the distributed parameter line Z1.

Similarly, the stable potential surface Z2 is connected to a connection hole P23 of the printed circuit board 25 of the switching power supply via connection holes and a means for linking connection holes, and is connected to the voltage Vb which is a stable potential in the switching power supply.

Next, the line length of the distributed parameter line Z1 is explained. As in a prior art embodiment of FIG. 4, when f=7 MHz and ∈r=4.21 are given, λ=20.9 m is produced and consequently $$\frac{1}{4} \cdot \lambda = 5.22 \text{ m}$$

is obtained.

Figure 8:
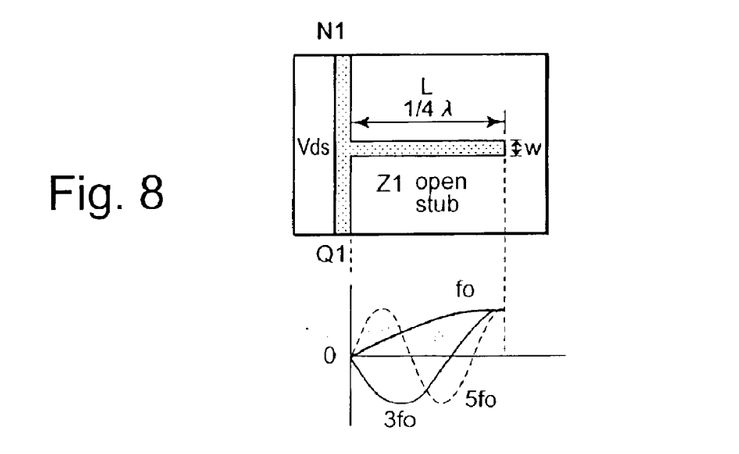
FIG. 8 illustrates voltage and amplitude characteristics of an open stub.

FIG. 8 illustrates voltage and amplitude characteristics of an open stub in the distributed parameter snubber circuit 20.

The open stub branches off at the voltage Vds in the main line which is a route from the primary winding N1 of the transformer T1 to the drain of the switching element Q1. The voltage Vds at the branch point of the open stub is a connection point among the primary winding N1 of the transformer T1, the drain end of the switching element Q1, and the distributed parameter line Z1. Although the schematic diagram of FIG. 6 shows that the distributed parameter line Z1 is linearly arranged on a flat surface, it is actually formed as a distributed parameter structure, which is a winding or folded structure.

The amplitude of a frequency, for which the line length L of the distributed parameter line Z1 is $$\frac{1}{4} \cdot \lambda,$$

becomes largest at an open end and zero at a branch end, while the branch end acts as a filter. Similarly, the branch end also acts as a filter for frequencies for which the line length of the distributed parameter line Z1 is $$\frac{3}{4} \cdot \lambda \text{ or } \frac{5}{4} \cdot \lambda,$$

and separates specific frequency elements of signals that propagate on the route from the primary winding N1 of the transformer T1 to the drain of the switching element Q1.

Similarly, in the voltage and amplitude characteristics (not shown in a figure) of a short stub comprising short-circuit ends, the amplitude of the frequency for which the line length of the distributed parameter line Z1 is $$\frac{1}{2} \cdot \lambda$$

becomes largest at the center of the distributed parameter line Z1 and zero at a branch end and a short circuit end, while the branch end acts as a filter.

Figure 9:
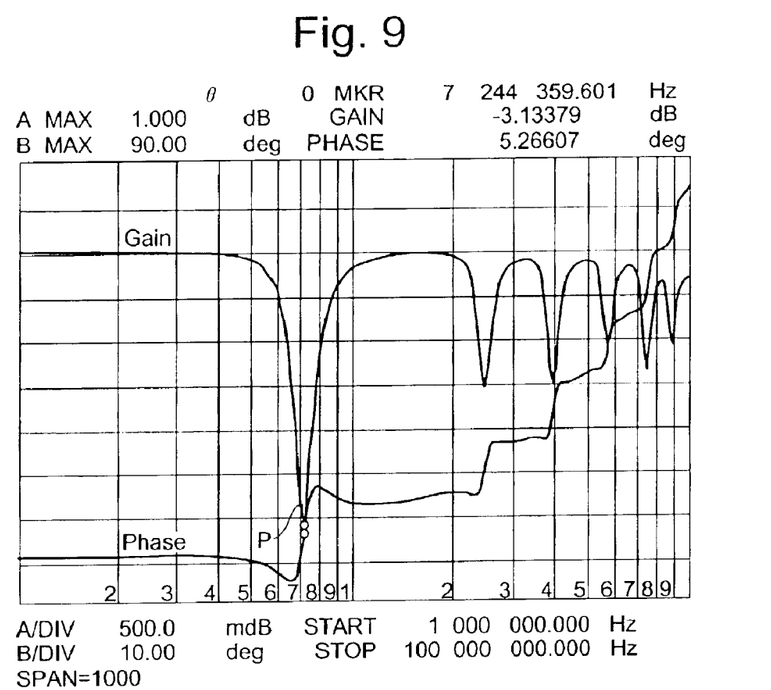
FIG. 9 illustrates impedance characteristics of the distributed parameter snubber circuit 20.

FIG. 9 illustrates impedance characteristics of the distributed parameter snubber circuit 20. The amplitude (gain) becomes the lowest and the phase is reversed at the 7 MHz frequency almost at the point P.

As is evident from the above, in a frequency band (MHz band), which becomes a problem in a switching power supply, and in a low frequency band, characteristics of the distributed parameter line Z1 are almost determined by its line length L, while influences of its width W, its thickness, and others are small. In addition, influences of whether it is arranged linearly or in coils or whether it is wound before folded or not are small.

Accordingly, with a distributed parameter structure where the distributed parameter line Z1 is formed in a winding or folded structure, the size of the switching power supply can be reduced for wavelengths corresponding to bands of low frequencies.

Now, behaviors of such an embodiment in FIG. 5 will be explained hereunder. Explanations of behaviors similar to those in a prior art embodiment in FIG. 1 will be omitted. The distributed parameter snubber circuit 20 suppresses a voltage surge that is generated when the switching element Q1 is turned off.

More specifically, when the switching element Q1 is turned on, the voltage Vds becomes low. Next, when the switching element Q1 is turned off, the voltage Vds rises and, at the same time, the voltage surge is generated.

Elements of the 7 MHz frequency of the voltage surge become low in impedance and are suppressed at the voltage Vds of the branch end of the distributed parameter line Z1. On the other hand, elements of the 7 MHz frequency of the voltage surge become electromagnetic waves and are emitted at an open end of the distributed parameter line Z1, but are shielded at the stable potential surface Z2.

Figure 10:
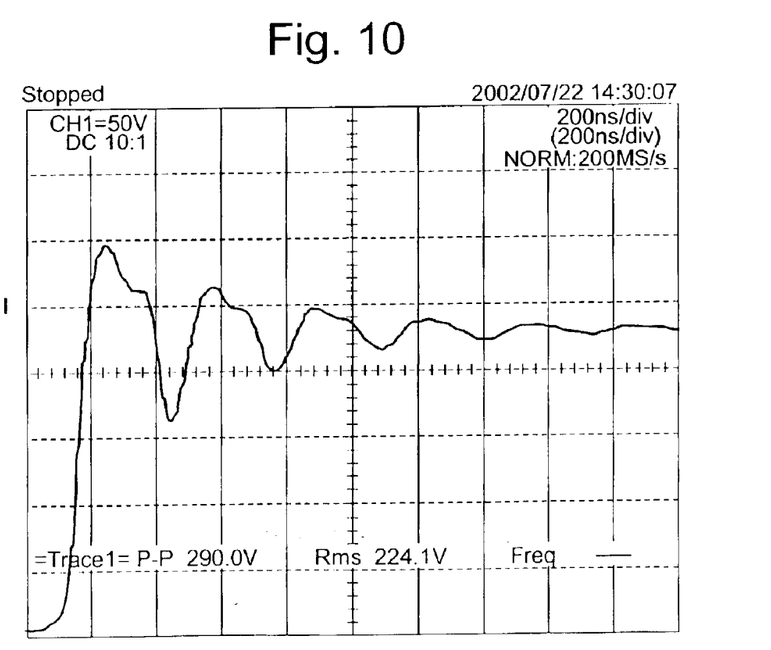
FIG. 10 illustrates waveforms of the voltage Vds of the embodiment in FIG. 5.

FIG. 10 illustrates waveforms of a voltage Vds when the switching element Q1 is turned off in an embodiment of FIG. 5. Elements of the 7 MHz frequency of the voltage surge disappear, while elements of almost 3 MHz are generated. Accordingly, peaks of the voltage surge of the voltage Vds are suppressed. Losses are rarely caused at the distributed parameter snubber circuit 20.

Figure 11:
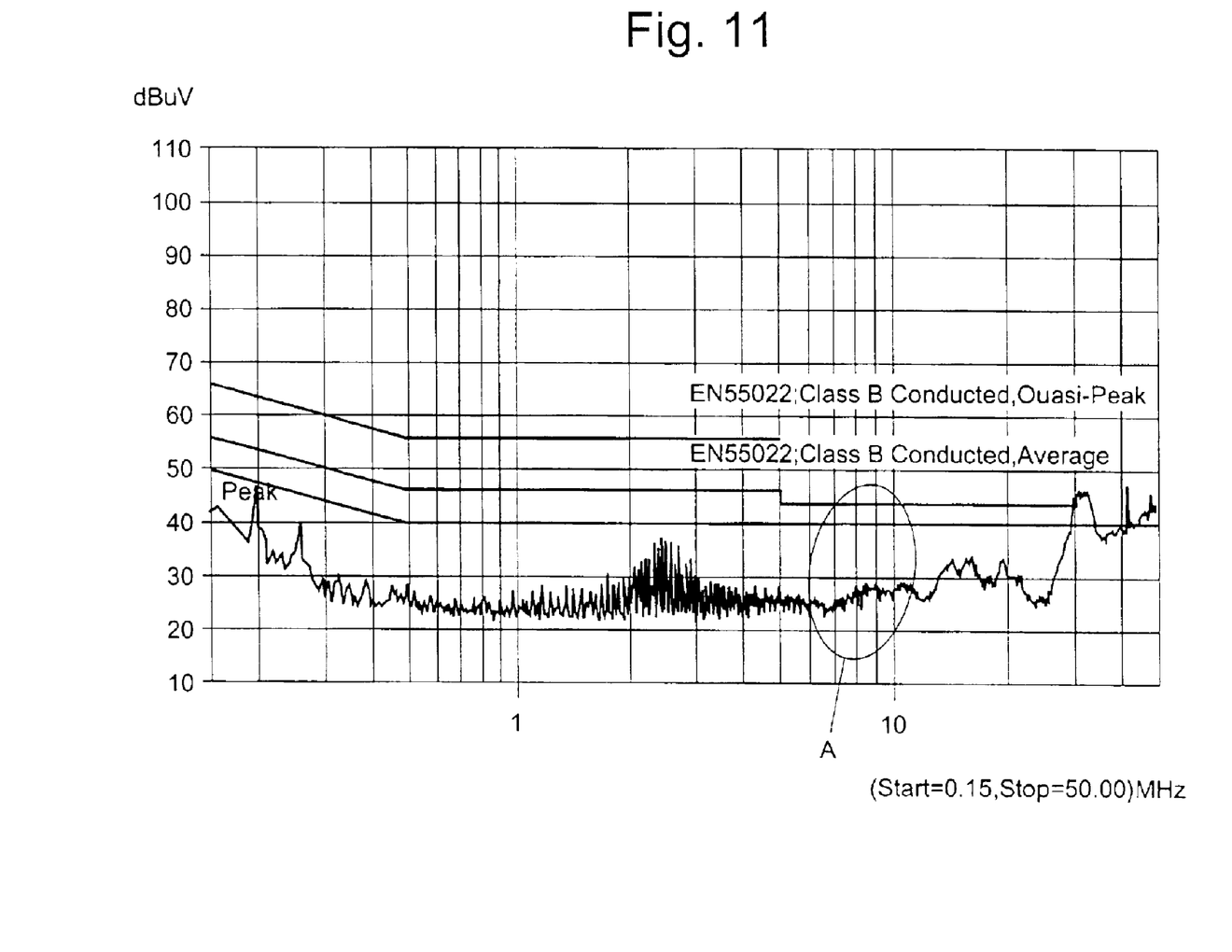
FIG. 11 illustrates conduction noise characteristics of the embodiment in FIG. 5.

FIG. 11 illustrates conduction noise characteristics of an embodiment of FIG. 5. In comparison with a prior art embodiment of FIG. 3, the noise with its peak at the 8 MHz frequency of the portion A is lower. This is because 7 MHz elements of the voltage surge of the voltage Vds are suppressed by the distributed parameter snubber circuit 20.

Accordingly, the distributed parameter snubber circuit 20 suppresses, with fewer losses, a voltage surge that is generated when the switching element Q1 is turned off.

In addition, the distributed parameter snubber circuit 20 can be formed in a practical size.

Figure 12:
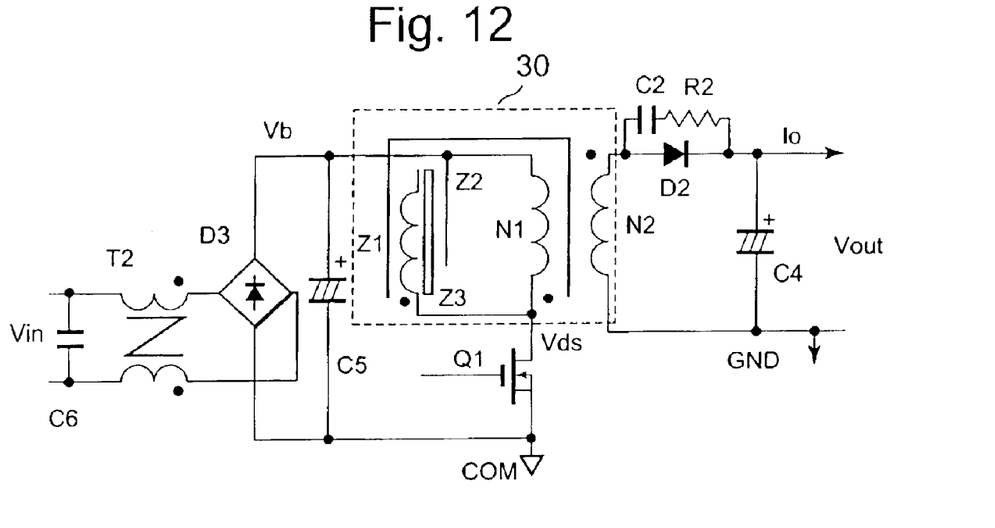
FIG. 12 is a schematic block showing a second embodiment of the present invention.

FIG. 12 shows a schematic block diagram of a second embodiment of a switching power supply according to the present invention. The same symbols will be given to the same elements as those of an embodiment of FIG. 5 and explanations will be omitted.

The embodiment of FIG. 12 is characterized in that a transformer and a primary snubber circuit are configured by a compound magnetic element 30 which comprises a distributed parameter line Z1, a stable potential surface Z2, a dielectric Z3, a primary winding N1, and a secondary winding N2.

More specifically, the primary winding N1, the secondary winding N2, the distributed parameter line Z1, and the stable potential surface Z2 are wound around the same core in the compound magnetic element 30.

Figure 13:
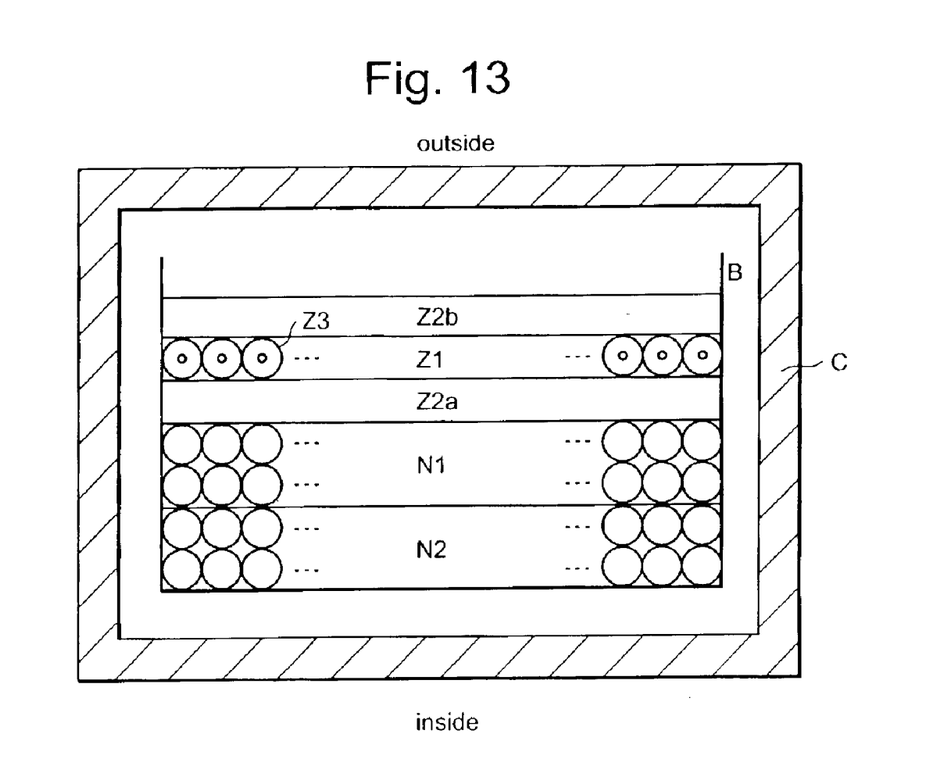
FIG. 13 is a cross section of a wiring structure of a compound magnetic element 30.

FIG. 13 shows a cross section of a winding structure of the compound magnetic element 30 in the embodiment of FIG. 12. In said cross section, the bottom shows the inside of the compound magnetic element 30, while the top shows the outside of the compound magnetic element 30. The respective windings and stable potential surfaces configure the layers. Starting from the inside, a secondary winding N2, a primary winding N1, a stable potential Z2a, a distributed parameter line Z1, and a stable potential surface Z2b are arranged. The respective layers are arranged in a bobbin B and a core C is arranged outside the bobbin B.

One end of the distributed parameter line Z1 is connected to the voltage Vds which is a fluctuating potential point in a switching power supply, while the other end is open. The distributed parameter line Z1 has a line length which is one fourth of a wavelength corresponding to the 7 MHz frequency of a voltage surge peculiar to the voltage Vds.

The stable potential surface Z2 comprises the stable potential Z2a and the stable potential surface Z2b, is arranged adjacent to the distributed parameter line Z1, and is connected to the voltage Vb which is a stable potential. The stable potential Z2a and the stable potential surface Z2b are formed in foils and are formed as Faraday shields in one turn so that both their ends will not be short-circuited.

The distributed parameter line Z1 is coated by polyurethane of the dielectric Z3 and is arranged closely with the stable potential surface Z2. The stable potential Z2a and the stable potential surface Z2b are arranged across the distributed parameter line Z1 and have a distributed parameter structure which is formed in coils of a winding structure. This structure enhances shield effects.

Figure 14:
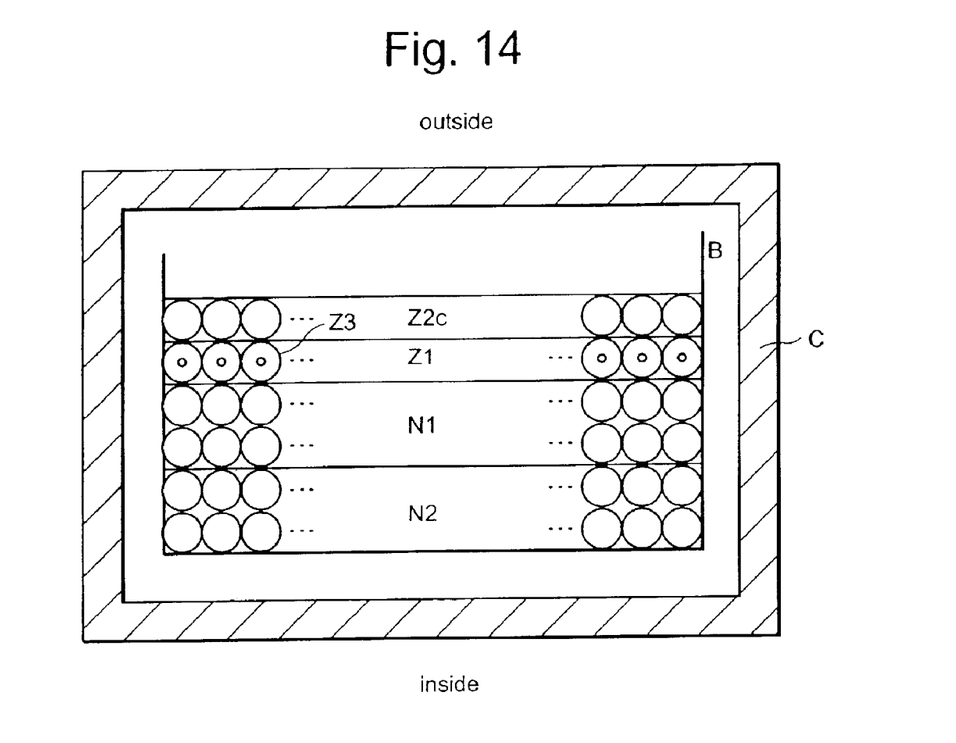
FIG. 14 is a cross section of another wiring structure of the compound magnetic element 30.

FIG. 14 shows a cross section of another winding structure in a compound magnetic element 30 of an embodiment of FIG. 12. The cross section of FIG. 14 is characterized in that, compared with the cross section of FIG. 13, a stable potential line Z2c instead of the stable potential surface Z2 is arranged adjacent to the distributed parameter line Z1 and that the distributed parameter line Z1 and the stable potential line Z2c are formed in coils of a winding structure. Explanations of the same portions as those in the cross section of FIG. 13 will be omitted.

More specifically, respective windings and layers of stable potential lines are, starting from the inside, the secondary winding N2, the primary winding N1, the distributed parameter line Z1, and the stable potential line Z2c.

The distributed parameter line Z1 and the stable potential line Z2c are bifilarly wound, are arranged in parallel and adjacent to the same line lengths, and at the same time have a stable parameter structure which forms the distributed parameter line Z1 and the stable potential line Z2c in a winding structure.

A connection end of the voltage Vds of the distributed parameter line Z1 and an open end of the stable potential line Z2c are matched, while an open end of the distributed parameter line Z1 and a connection end of the voltage Vb, which is a stable potential of the stable potential line Z2c, are matched.

When the distributed parameter line Z1 and the stable potential line Z2c are bifilarly wound, the distributed parameter line Z1 and the stable potential line Z2c are connected closely and a voltage induced by the magnetic flux of the core C is cancelled so that preferred characteristics will be provided for suppressing surges.

Explanations of the foregoing behaviors of the embodiment of FIG. 12 will be omitted, because they are the same as in the case of the embodiment of FIG. 5. In comparison with the embodiment of FIG. 5, the embodiment of FIG. 12 contains fewer elements, is smaller in size, and costs less.

Although the distributed parameter line Z1 and the stable potential line Z2c are bifilarly wound in the above example, the distributed parameter line Z1 and the stable potential line Z2c may be formed differently with a coaxial cable and have the distributed parameter structure in which they are formed in a winding structure. More specifically, either one of the distributed parameter line Z1 and the stable potential line Z2c is used as an internal conductor of the coaxial cable, while the other is used as an external conductor of the coaxial cable.

Figure 15:
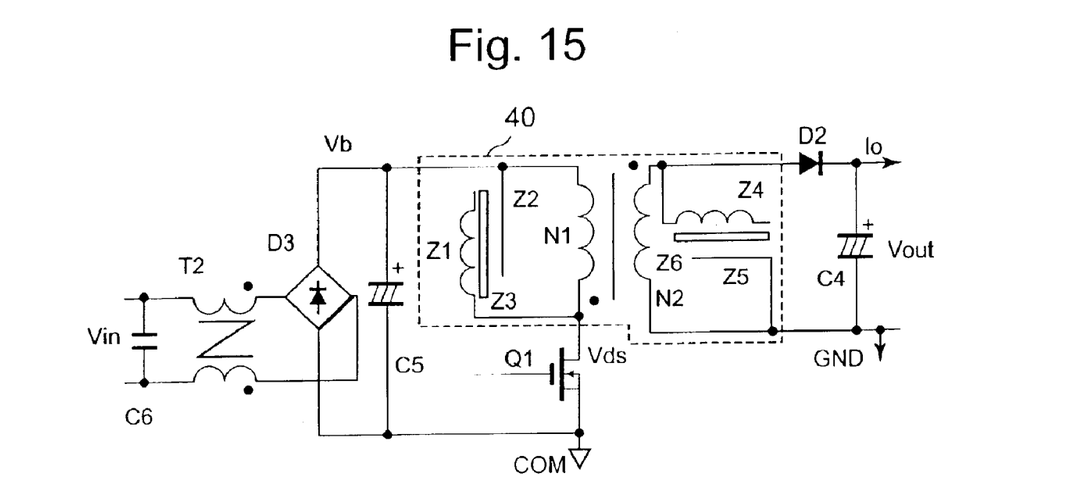
FIG. 15 is a schematic block diagram showing a third embodiment of the present invention.

FIG. 15 is a schematic block diagram showing a third embodiment of a switching power supply according to the present invention. The same symbols will be given to the same elements as those of the embodiment of FIG. 12 and their explanations will be omitted.

An embodiment of FIG. 15 is characterized in that a transformer, a primary snubber circuit, and a secondary snubber circuit are configured by a compound magnetic element 40 which comprises a distributed parameter line Z1, a stable potential surface Z2, a dielectric Z3, a primary winding N1, a secondary winding N2, a distributed parameter line Z4, a stable potential surface Z5, and a dielectric Z6.

The distributed parameter line Z4, the stable potential surface Z5, and the dielectric Z6 configure a distributed parameter snubber circuit as in the case of the distributed parameter line Z1, the stable potential surface Z2, and the dielectric Z3, and suppress voltage surges generated at a diode D2.

One end of the distributed parameter line Z4 is connected to the anode of the diode 2 which is a fluctuating potential point in a switching power supply, and the other end is open. The distributed parameter line Z4 has a line length which is one fourth of a wavelength for a voltage surge peculiar to the anode of the diode D2.

The stable potential surface Z5 is arranged adjacent to the distributed parameter line Z4 and is connected to the stable potential GND. The dielectric Z3 is provided between the distributed parameter line Z1 and the stable potential surface Z2.

Since behaviors of the distributed parameter line Z4, the stable potential surface Z5, and the dielectric Z6 are the same as those of the distributed parameter snubber circuit 20 of an embodiment in FIG. 5, their explanations will be omitted.

Figure 16:
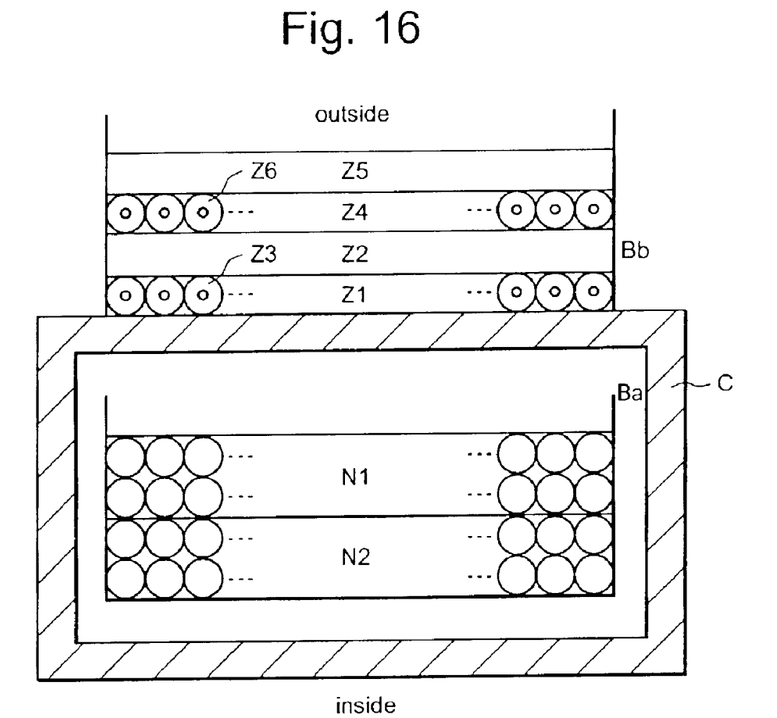
FIG. 16 is a cross section of a wiring structure of a compound magnetic element 40.

FIG. 16 shows a cross section of the winding structure in the compound magnetic element 40 of the embodiment of FIG. 15. The cross section of FIG. 16 is characterized in that windings and stable potential surfaces are arranged outside the core C and that they are formed windingly.

All windings and stable potential surfaces of the embodiment in FIG. 15 may also be arranged inside the core C as shown in the cross sections of FIGS. 13 and 14. Similarly, windings and stable potential surfaces of the embodiment in FIG. 12 may also be arranged outside the core C as shown in the cross section of FIG. 16, and similar effects can be obtained.

In the cross section of FIG. 16, the bottom shows the inside of the compound magnetic element 40, while the top shows the outside of the compound magnetic element 40. The respective windings and stable potential surfaces configure layers. A secondary winding N2 and a primary winding N1 are arranged in a bobbin Ba inside the core C, while a distributed parameter line Z1, a stable potential surface Z2, a distributed parameter line Z4, and a stable potential surface Z6 are arranged in a bobbin Bb outside the core C, and are formed in a winding structure to provide a distributed parameter structure.

The stable potential surface Z2 and the stable potential surface Z5 are formed in foils and, because both their ends are short-circuited as short strings, their potential surfaces are equivalent and their potentials are stable. In addition, since magnetic fluxes generated by the primary winding N1 and the secondary winding N2 do not cross-link the distributed parameter line Z1, the stable potential surface Z2, the distributed parameter line Z4, and the stable potential surface Z5, electric potentials become stable and provide preferred characteristics to suppress surges.

Figure 17:
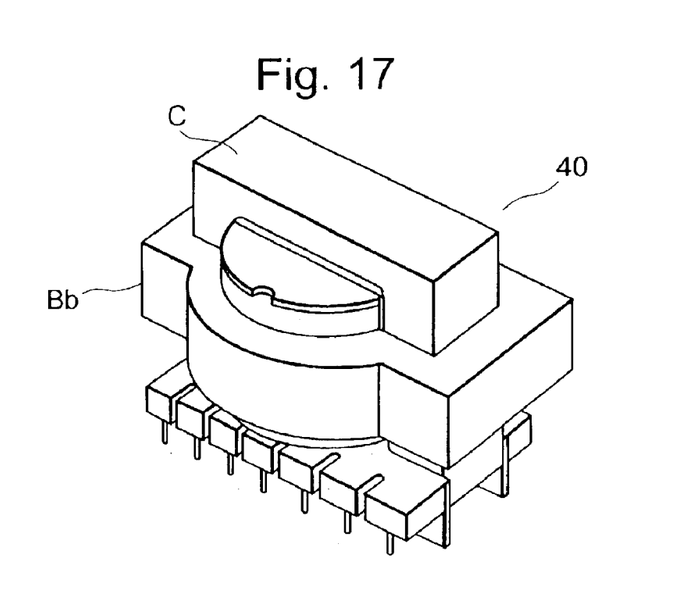
FIG. 17 is an external perspective diagram of the compound magnetic element 40.

FIG. 17 shows an external perspective diagram of a compound magnetic element 40 in FIG. 16. A bobbin Bb is arranged outside a core C.

Since behaviors of the embodiment in FIG. 15 as shown in the above are the same as those of the embodiment in FIG. 12, their explanations will be omitted. In comparison with the embodiment of FIG. 12, the embodiment of FIG. 15 requires fewer elements, becomes smaller in size costs less, and causes fewer losses.

Although the distributed parameter line Z1, the stable potential surface Z2, and the dielectric Z3, as well as the distributed parameter line Z4, the stable potential surface Z5, and the dielectric Z6 configure open stubs in the above example, they may differently configure short stubs.

More specifically, one end of the distributed parameter line Z1 is connected to the voltage Vds which is a fluctuating potential point in a switching power supply, while the other end is connected to the voltage Vb, which is a stable potential, and has a line length which is approximately a half of a wavelength in a voltage surge peculiar to the voltage Vds. One end of the distributed parameter line Z4 is connected to the anode of a diode D2 which is a fluctuating potential point in a switching power supply, while the other end is connected to a stable potential GND and has a line length which is approximately a half of a wavelength in a voltage surge peculiar to the anode of the diode D2.

Although explanations for the behaviors of such cases are omitted because they are the same as those of the aforementioned embodiment, a short stub can enhance shield effects because ends of the distributed parameter lines Z1 and Z4 become stable potentials and their amplitudes become largest at the centers of stable potential surfaces Z2 and Z5.

While the above example uses a fly-back converter, a forward converter, a non-isolated converter, or other converter methods may be-used. Similar effects can also be obtained in these cases.

Also, while a snubber circuit and a transformer are combined as a compound magnetic element in the above example, the snubber circuit and a smoothing choke may be differently combined as a compound magnetic element. The size of an embodiment can also be reduced in this case.

Figure 18:
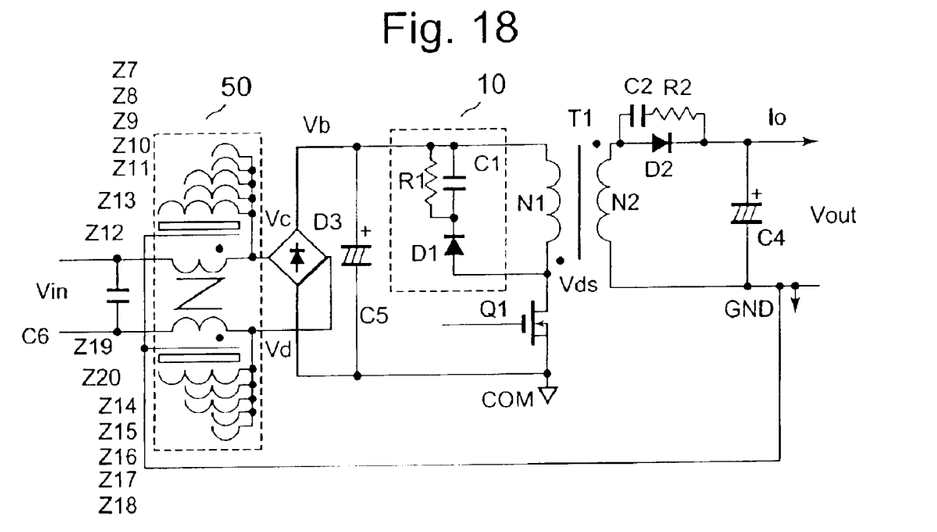
FIG. 18 is a schematic block diagram showing a fourth embodiment of the present invention.

FIG. 18 shows a schematic block diagram of a fourth embodiment of a switching power supply according to the present invention. The same symbols will be given to the same elements as those of the prior art embodiment of FIG. 1 and explanations will be omitted.

An embodiment of FIG. 18 is characterized by the configuration of a compound magnetic element 50 which is formed by winding distributed parameter lines Z7 to Z11, a stable potential surface Z12, a dielectric Z13, distributed parameter lines Z14 to Z18, a stable potential surface Z19, and a dielectric Z20 around the line filter T2 which is a filter inductor in FIG. 1.

The compound magnetic element 50 acts as a filter suppressing noise on a line. Distributed parameter lines can not only suppress surges as shown by embodiments of FIGS. 1, 12, and 15, but also can suppress noise as shown in the embodiment of FIG. 18.

More specifically, distributed parameter lines Z7 to Z11, a stable potential surface Z12, and a dielectric Z13, as well as distributed parameter lines Z14 to Z18, a stable potential surface Z19, and a dielectric Z20 are arranged symmetrically.

One end of each of distributed parameter lines Z7 to Z11 is connected to the point Vc connecting with a line filter and a diode bridge D3, which is a fluctuating potential point in a switching power supply, while other ends are open. Similarly, one end of each of distributed parameter lines Z14 to Z18 is connected to the point Vd connecting with a line filter and a diode bridge D3, which is a fluctuating potential point in a switching power supply, while other ends are open.

In the route from the line filter to the diode bridge D3 which is a main line, distributed parameter lines Z7 to Z11 and distributed parameter lines Z14 to Z18, which branch off at connection points Vc and Vd, configure a filter and separate specific frequency elements of signals that propagate on the main line.

Distributed parameter lines Z7 to Z11 and distributed parameter lines Z14 to Z18 connect five distributed parameter lines in parallel respectively. The lengths of five distributed parameter lines are set to be 15 m, 1.5 m, 1 m, 0.75 m, and 0.5 m respectively.

Stable potential surfaces Z12 and Z19 are arranged adjacent to distributed parameter lines Z7 to Z11 and distributed parameter lines Z14 to Z18, and are connected to the stable potential GND. Dielectrics Z13 and Z20 are to be provided between distributed parameter lines Z7 to Z11 and distributed parameter lines Z14 to Z18 on the one hand and stable potential surfaces Z12 and Z19 on the other.

More specifically, distributed parameter lines Z7 to Z11 and distributed parameter lines Z14 to Z18 are coated with polyurethane of dielectrics Z13 and Z20, are closely arranged with stable potential surfaces Z12 and Z19, and at the same time are in a distributed parameter structure where they are wound around the core of a line filter T2.

Distributed parameter lines are connected in parallel so that their filtering characteristics will be provided in a wide band. Lengths of distributed parameter lines are 15 m, 1.5 m, 1 m, 0.75 m, and 0.5 m, which correspond to frequencies 2.4 MHz, 24 MHz, 37 MHz, 49 MHz, and 73 MHz respectively according to $\in r=4.21$.

Figure 19:
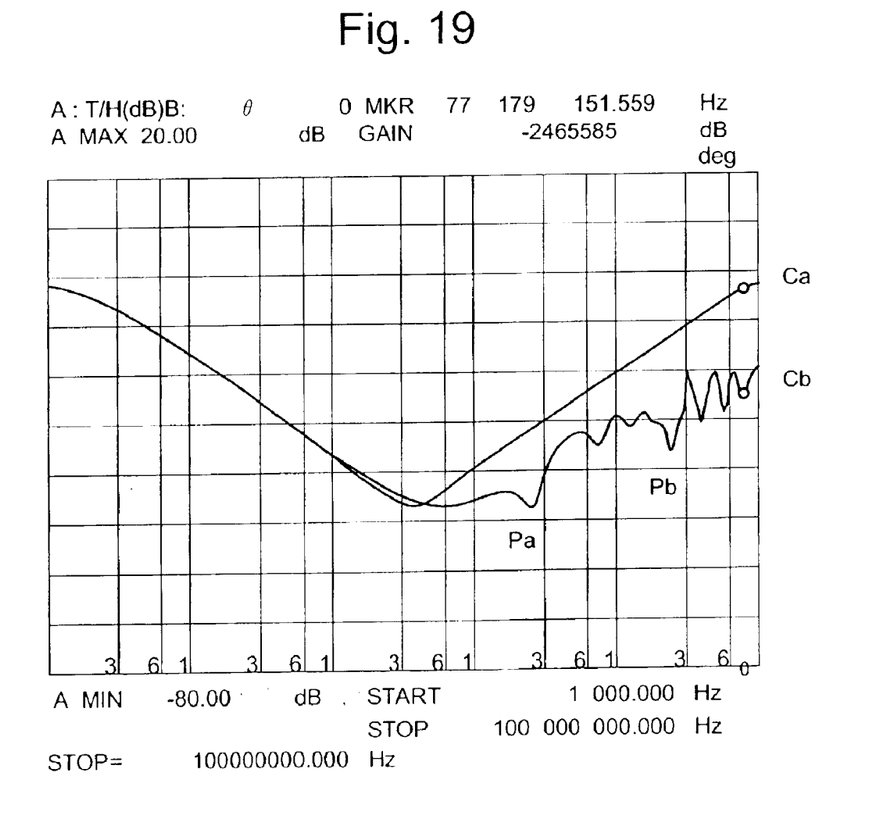
FIG. 19 illustrates attenuation characteristics of a line filter T2 and a compound magnetic element 50.

FIG. 19 illustrates attenuation characteristics of a line filter T2 and a compound magnetic element 50. A characteristic Ca shows a characteristic of the line filter T2 in the prior art embodiment of FIG. 1. A characteristic Cb shows a characteristic of the compound magnetic element 50 in the embodiment of FIG. 18.

The characteristic Ca of the line filter T2 has a resonant point at around 500 kHz and the largest attenuation value can be obtained near the resonant point. In a frequency higher than the resonant point, attenuation values increase and filtering characteristics deteriorate.

Although the characteristic Cb of the compound magnetic element 50 is equivalent to the characteristic Ca at a frequency lower than the resonant point of 500 kHz, its filtering characteristic is enhanced because the increase of attenuation values is suppressed by the effects of distributed parameter lines Z7 to Z11 and distributed parameter lines Z14 to Z18 at a frequency higher than the resonant point.

In the characteristic Cb, peak characteristics Pa and Pb can be observed at the frequencies 2.4 MHz and 24 MHz which are peculiar to distributed parameter lines.

Figure 20:
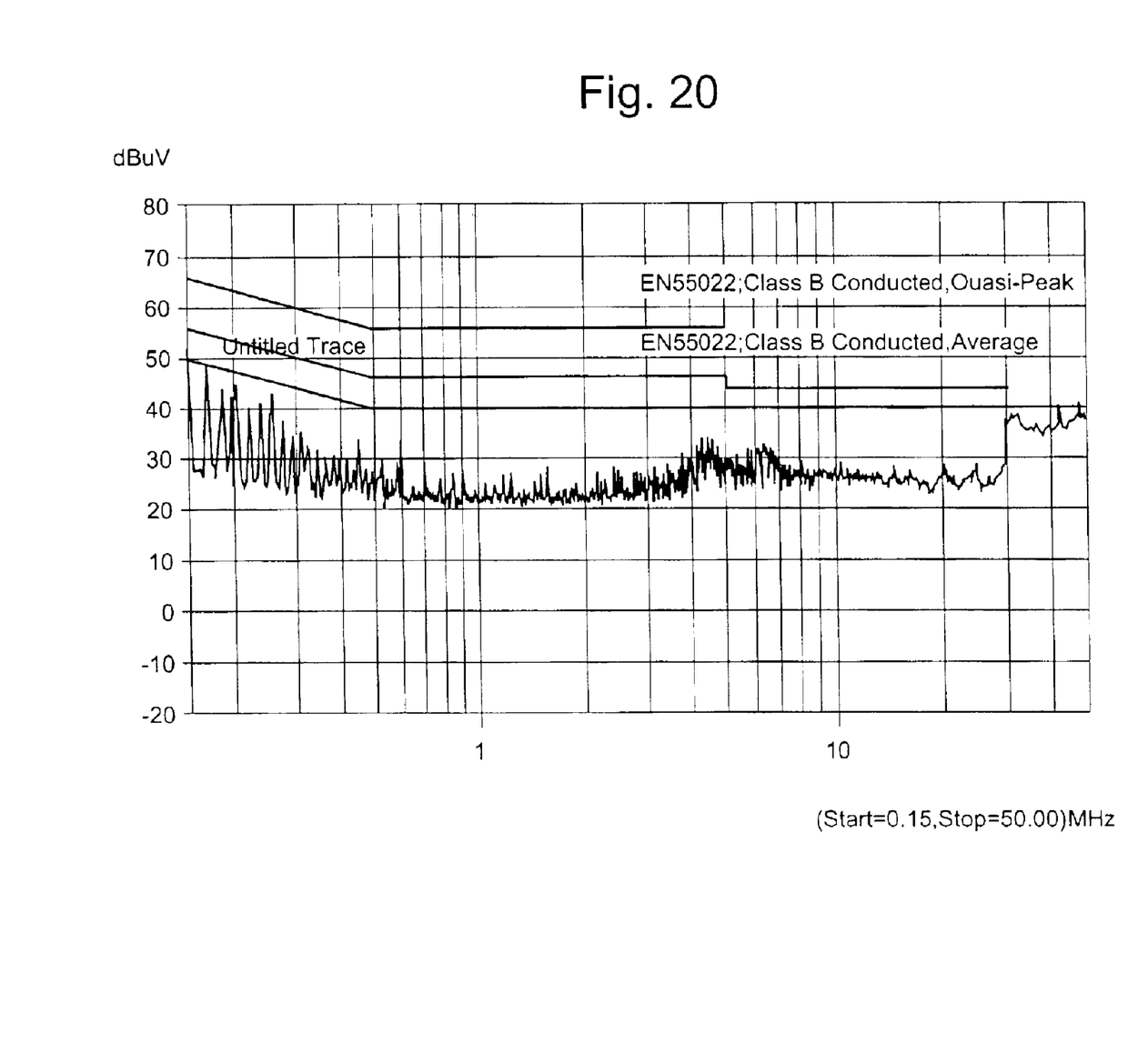
FIG. 20 illustrates conduction noise characteristics of the embodiment in FIG. 18.

FIG. 20 illustrates conduction noise characteristics of an embodiment of FIG. 18. In comparison with a prior art embodiment of FIG. 3, the noise level decreases at a frequency higher than the resonant point of 500 kHz. Noise is suppressed by the compound magnetic element 50.

Although the above example shows an arrangement of a distributed parameter line for each of the two lines of the line filter, which is a filtering inductor, to suppress common mode noise, similar effects can be obtained by arranging distributed parameter lines differently to normal mode chokes (not shown in a diagram), which are filtering inductors, in order to suppress normal mode noise.

As is evident from the foregoing explanations, the present invention provides the following effects:

According to one aspect of the present invention described in claim 1, fluctuation of electric potentials in a switching power supply can be suppressed. Voltage surges and noise can be suppressed.

According to another aspect of the present invention described in claim 2, emissions of electromagnetic waves from a distributed parameter line can be shielded. Accordingly, noise characteristics of a switching power supply can be improved.

According to yet another aspect of the present invention described in claim 3, a length of a distributed parameter line can be minimized. Accordingly, a switching power supply can be made smaller and less costly.

According to yet another aspect of the present invention described in claim 4, the other end of a distributed parameter line can be stabilized to enhance shield effects. Accordingly, noise characteristics of a switching power supply can be improved.

According to yet another aspect of the present invention described in claims 5 to 7, the number of parts configuring a switching power supply can be reduced to make it smaller and less costly, and so it can be formed in a practical size.

According to yet another aspect of the present invention described in claim 8 or 9, a distributed parameter structure is provided to enable the formation of smaller elements. Areas of implementation can thus be made smaller, and elements can be formed in a practical size in a switching power supply.

According to yet another aspect of the present invention described in claim 10, electric potential fluctuations and noise in a wide band can be suppressed. Noise can also be suppressed in a switching power supply.

According to yet another aspect of the present invention described in claim 11, a single element can suppress a plurality of voltage surges in a switching power supply. Common mode noise can also be suppressed in the switching power supply.

What is claimed is:

1. A switching power supply, wherein voltages and currents are varied by turning a switching element on and off to convert input voltages into output voltages, comprising a distributed parameter line at a fluctuating potential point in said switching power supply and having a line length of about $$\frac{n}{4}$$

(n is an integer of ono or more) of a wavelength peculiar to said potential point.

2. The switching power supply of claim 1, wherein a stable potential surface or a stable potential line is adjacent to said distributed parameter line and is connected to a stable potential point.

3. The switching power supply of claim 1 or claim 2, wherein one end of said distributed parameter line is connected with said potential point, while the other end is open, and wherein the length of said distributed parameter line is in the order of one fourth of said wavelength.

4. The switching power supply of either claim 1 or claim 2, wherein one end of said distributed parameter line is connected to said potential point, while the other end is connected to a stable potential point, and wherein the length of said distributed parameter line is in the order of a half of said wavelength.

5. The switching power supply of any one of claim 1 or 2, wherein said distributed parameter line is wound around a transformer in said switching power supply.

6. The switching power supply of any one of claim 1 or 2, wherein said distributed parameter line is wound around a smoothing choke in said switching power supply.

7. The switching power supply of any one of claim 1 or 2, wherein said distributed parameter line is wound around a filter inductor in said switching power supply.

* * * * *